United States Patent
Cvetkovich et al.

(10) Patent No.: US 12,100,004 B2
(45) Date of Patent: *Sep. 24, 2024

(54) PAYER-CONTROLLED PAYMENT PROCESSING

(71) Applicants: Benjamin M. Cvetkovich, Loveland, CO (US); Greg T. Meyers, Providence, UT (US)

(72) Inventors: Benjamin M. Cvetkovich, Loveland, CO (US); Greg T. Meyers, Providence, UT (US)

(73) Assignee: KUBERA LIMITED LIABILITY COMPANY, Loveland, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/614,232

(22) Filed: Mar. 22, 2024

(65) Prior Publication Data
US 2024/0232886 A1    Jul. 11, 2024

Related U.S. Application Data

(63) Continuation of application No. 18/534,751, filed on Dec. 11, 2023, which is a continuation-in-part of (Continued)

(51) Int. Cl.
*G06Q 20/40* (2012.01)
*G06Q 20/18* (2012.01)
(Continued)

(52) U.S. Cl.
CPC ......... *G06Q 20/4014* (2013.01); *G06Q 20/18* (2013.01); *G06Q 20/3274* (2013.01); *H04L 9/3213* (2013.01); *H04L 2209/56* (2013.01)

(58) Field of Classification Search
CPC .................................................... G06Q 20/20
(Continued)

(56) References Cited

U.S. PATENT DOCUMENTS 6,227,447 B1   5/2001  Campisano
2014/0052553 A1   2/2014  Uzo
(Continued)

OTHER PUBLICATIONS

Wikipedia, Virtual private network, Jul. 16, 2023, https://en.wikipedia.org/w/index.php?title=Virtual_private_network&oldid=1165634451.
(Continued)

*Primary Examiner* — Cho Kwong
(74) *Attorney, Agent, or Firm* — HOLLOWELL PATENT GROUP; Kelly Hollowell

(57) ABSTRACT

An apparatus comprising an authorization server, merchant device and payer device, including a virtual private network (VPN) communicatively coupled with the merchant device processor and the payer device processor, wherein the VPN tunnels through a communication network, the payer device is configured to receive a first encrypted message from the merchant using at least one of: the VPN, an image-capturing interface, or a near-field communication interface, depending on the type of the transaction initiated by the payer. In response to receiving a purchase request from the payer using the payer device: the merchant device sends on the VPN to the payer device, the first encrypted message comprising the security key and transaction information referencing the purchase request. An implementation can conduct a secure transaction using a VPN connection between the payer device and the merchant device, improving electronic transaction security, preventing replay attacks and data capture by an adversary.

26 Claims, 8 Drawing Sheets

Related U.S. Application Data application No. 17/557,030, filed on Dec. 20, 2021, now abandoned, which is a continuation of application No. 16/237,038, filed on Dec. 31, 2018, now abandoned.

(60) Provisional application No. 62/643,029, filed on Mar. 14, 2018.

(51) Int. Cl.
*G06Q 20/32* (2012.01)
*H04L 9/32* (2006.01)

(58) Field of Classification Search
USPC .......................................................... 705/44
See application file for complete search history.

(56) References Cited

U.S. PATENT DOCUMENTS

| | | |
|---|---|---|
| 2015/0154597 A1 | 6/2015 | Bacastow |
| 2015/0248664 A1 | 9/2015 | Makhdumi |

OTHER PUBLICATIONS

Wikipedia, OpenVPN, Nov. 13, 2023, https://en. wi ki pedia. org/w/index.php?title=OpenVPN&oldid=1184846025.

PAYER-CONTROLLED PAYMENT PROCESSING

CROSS REFERENCE TO RELATED APPLICATIONS

This application is a continuation of U.S. application Ser. No. 18/534,751 filed Dec. 11, 2023, which is a continuation-in-part of U.S. application Ser. No. 17/557,030 filed Dec. 20, 2021, which is a continuation of U.S. application Ser. No. 16/237,038 filed Dec. 31, 2018, which claims the benefit of U.S. Provisional Application No. 62/643,029 filed Mar. 14, 2018, and this application incorporates the entire contents of the above-referenced applications herein by reference.

SUMMARY

The disclosure seeks to describe a method for payment authorization. The method includes, receiving, from a payer device merchant identification, kiosk identification identifying a merchant kiosk, a security key and transaction information transmitted to the payer device from a merchant device registered with the merchant identification and payer identification associated with the payer device. The method further includes validating the merchant identification, the kiosk identification, the payer identification and the security key when the merchant identification is registered with the kiosk identification in an authorization database, the payer identification is registered with a payer token in the authorization database and the security key is valid. A transaction request is derived from the validated merchant identification, the payer token with which the payer identification is registered and the transaction information and for a transaction referred to by the transaction information. The method further includes receiving, from an acquirer system, an authorization report based upon the transaction request.

The disclosure further seeks to describe a system for payment authorization. The system includes an authorization database and an authorization server. The authorization server is configured to receive, from a payer device, a payer identification associated with the payer device as well as merchant identification, kiosk identification identifying a merchant kiosk, a security key and transaction information transmitted to the payer device from a merchant device registered with the merchant identification. The authorization server is further configured to validate the merchant identification, the kiosk identification, the payer identification and the security key when the merchant identification is registered with the kiosk identification in an authorization database, the payer identification is registered with a payer token in the authorization database and the security key is valid. A transaction request is derived from the validated merchant identification, the payer token with which the payer identification is registered and the transaction information. For a transaction referred to by the transaction information the authorization server is configured to receive, from an acquirer system, an authorization report based upon the transaction request.

The disclosure further seeks to describe a computer program product including a non-transitory computer-readable storage medium storing computer-executable code for payment authorization. The code, when executed, is configured to cause one or more computers to receive, from a payer device: merchant identification, kiosk identification identifying a merchant kiosk, a security key and transaction information transmitted to the payer device from a merchant device registered with the merchant identification and payer identification associated with the payer device. The code, when executed is further configured to cause one or more computers to validate the merchant identification, the kiosk identification, the payer identification and the security key when the merchant identification is registered with the kiosk identification in an authorization database, the payer identification is registered with a payer token in the authorization database and the security key is valid. A transaction request is derived from the validated merchant identification, the payer token with which the payer identification is registered and the transaction information. For a transaction referred to by the transaction information, the code when executed is configured to cause one or more computers to receive, from an acquirer system, an authorization report based upon the transaction request.

The disclosure, still further, seeks to describe a computer program product including a non-transitory computer-readable storage medium storing computer-executable code for transaction validation. The code, when executed, is configured to cause a payer device to receive, merchant identification, kiosk identification identifying the merchant kiosk, a security key and transaction information. The code is further configured to cause the payer device to transmit, to an authorization server: the merchant identification, the kiosk identification, the security key and the transaction information and payer identification associated with the payer device in an authorization database of the authorization server. The code is further configured to cause the payer device to receive an authorization notification based upon an authorization report received by the authorization for a transaction referred to by the transaction information.

Still further, the disclosure seeks to provide a method for payment authorization, including receiving, from a cardholder device registered with a cardholder identification, merchant identification and transaction information transmitted to the cardholder device from a merchant device registered with the merchant identification and the cardholder identification. A transaction request is derived from the cardholder identification and the transaction information. The transaction request is transmitted to an acquirer device, an authorization is received from the acquirer device for a transaction referred to by the transaction information and transaction approval codes are transmitted for the transaction to the merchant device based upon the authorization.

BRIEF DESCRIPTION OF THE FIGURES

The summary above, as well as the following detailed description of illustrative embodiments, is better understood when read in conjunction with the appended figures. For the purpose of illustrating the present disclosure, example constructions of the disclosure are shown in the figures. However, the present disclosure is not limited to specific methods and instrumentalities disclosed herein. Moreover, those having ordinary skill in the art will understand that the figures are not to scale. Wherever possible, like elements have been indicated by identical numbers.

Embodiments of the present disclosure will now be described, by way of example only, with reference to the following diagrams wherein.

DETAILED DESCRIPTION

The following detailed description illustrates embodiments of the present disclosure and manners by which they can be implemented. Although the best mode of carrying out the present disclosure has been disclosed, those having ordinary skill in the art would recognize that other embodiments for carrying out or practicing the present disclosure are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Known smartphones and similar devices may be used as a means for initiating payments. An electronic wallet provides credit card or debit card information or other account information to a merchant for approval. The payer, who may also be an accountholder and/or cardholder, is required to authenticate use of the wallet via fingerprint or passcode and a transaction authorization is secured from the account- or card-issuing bank. Account information and other data may be encrypted or masked but it is nevertheless vulnerable during transmission. Almost all credit/debit card information is accessed and stolen somewhere along the chain of the transaction process.

Figure 1:
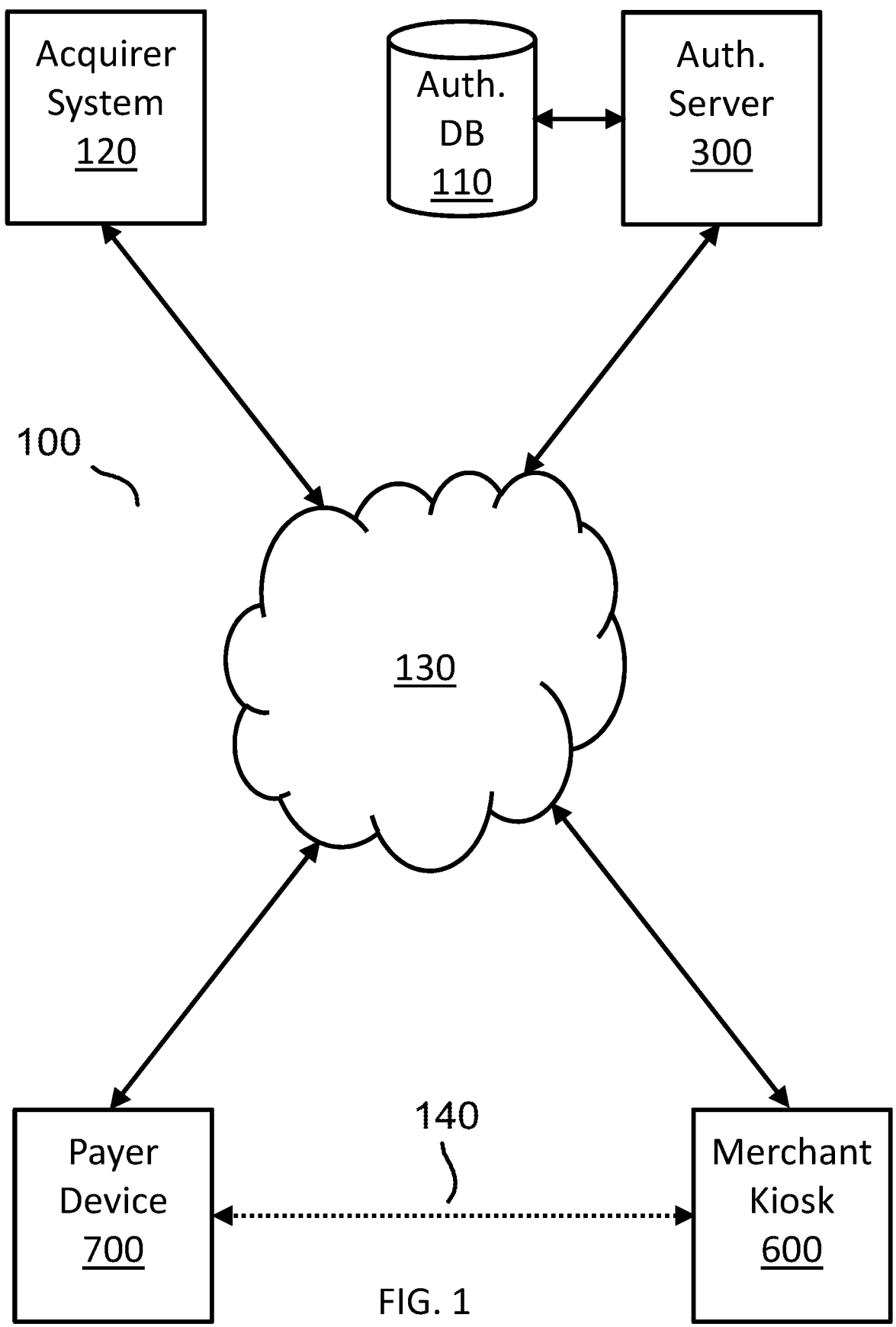
FIG. 1 schematically illustrates the exemplary distributed payer-controlled payment system architecture 100 in a network environment suitable for practicing methods, systems and computer program products for payment authorization.

Systems and methods in accordance with the disclosure take the standard electronic payment process and completely reverse it while also removing the element of transmitting any account data in any form to the merchant or merchant's payment processor or acquirer. Further disclosed systems and methods regulate entry of participants such as merchants to an otherwise closed payment system. Problems of the prior art are eliminated, or at least partially addressed, enabling completion of transactions without transmitting any information to the merchant, except for transaction approval notification. Completion of transactions without transmitting any information to the merchant except transaction approval notification, may be a result of an exemplary distributed payer-controlled payment architecture comprising at least a payer device, a merchant device and an authorization server, individually and collectively programmed and configured in accordance with the present disclosure. For example, the payer device, the merchant device and the authorization server may be individually and collectively programmed and configured to collaborate in unconventional distributed operations directed to completing payer-initiated transactions with a merchant without transmitting any information to the merchant except transaction approval notification. These unconventional distributed operations eliminate any possibility of stealing payer information, such as but not limited to, payer account and payer identity information, from the electronic transaction chain with the merchant. For example, an exemplary distributed payer-controlled payment architecture, as shown in FIG. 1, comprises a payer device, a merchant device and an authorization server individually and collectively programmed and configured to respond to payer initiation of a transaction by receiving, from the payer device: merchant identification, kiosk identification identifying a merchant kiosk, a security key and transaction information transmitted to the payer device from the merchant device registered with the merchant identification and payer identification that is associated with the payer device; validating the merchant identification, the kiosk identification, the payer identification and the security key when 1) the merchant identification is registered with the kiosk identification in an authorization database, 2) the payer identification is registered with a payer token in the authorization database, and 3) the security key is valid; deriving a transaction request from the 1) validated merchant identification, 2) validated payer token with which the payer identification is registered, and 3) transaction information; and for a transaction referenced by the transaction information received by the payer device from the merchant device, receiving, from an acquirer system, an authorization report based upon the transaction request, thereby illustrating unconventional operations using a distributed payer-controlled payment architecture. A reduction of account information theft, and, as adopted, elimination of onerous compliance issues for merchants are also enabled. By removing sensitive payer data such as account information and/or card numbers from the transaction chain, there is nothing to steal.

A general overview description of disclosed systems and methods will be given, followed by more detailed descriptions.

A payer application functions both to verify who the payer is and approve the transaction, for example, authorizing an acquirer to pay the merchant on the payer's behalf using payer's funds or credit. A merchant application verifies the merchant and where the transaction funds will be sent as well as the transaction amount. The net result is a closed transaction circle without the need to transmit sensitive data.

The payer may activate the application on his or her device, for example, using a passcode and/or a biometric authentication such as a fingerprint when he/she is ready to pay. Activating the application prepares the payer device to receive an encrypted message from the merchant, containing merchant ID and transaction information.

The merchant may enter the amount of the transaction on his or her device using the merchant application and send the encrypted message to the payer who then approves the transaction and sends associated information on to system servers.

Once received, the authorization is processed with a card issuing bank, an acquirer and/or card networks and an encrypted authorization is transmitted through the applications to both the payer and merchant.

Both the payer and the merchant may receive an encrypted approval code, and the transaction is complete.

Never is any credit or debit card information transmitted during a transaction.

Additional aspects, advantages, features and objects of the disclosure will be made apparent from the figures and the detailed description of the illustrative embodiments construed in conjunction with the appended claims that follow. It will be appreciated that features of the disclosure are susceptible to being combined in various combinations without departing from the scope of the disclosure as defined by the appended claims.

FIG. 1 schematically illustrates the exemplary distributed payer-controlled payment system architecture 100 in a network environment suitable for practicing methods, systems and computer program products for payment authorization and for supporting payer-controlled payment processing services.

The example network environment includes one or more data processing systems, for example, in the form of a payer device 700, a merchant kiosk 600 and an acquirer system 120. The network environment also includes an authorization server 300, a database 110 associated with authorization server 300 and a communication network 130.

Communication network 130 generally includes a network of one or more communication links and two or more nodes that pass messages from one part of the network to another part. Each node has one or more pieces of electrical machinery, and each link may include one or more of optical fibers, optical links, radio links, electrical wires.

The network environment may be implemented in various ways, depending on various possible scenarios. In one example scenario, the network environment may be implemented by way of a spatially collocated arrangement of server and database. In another example scenario, the network environment may be implemented by way of a spatially distributed arrangement of server and database coupled mutually in communication via the communication network 130. In yet another example scenario, server and database may be implemented via cloud computing services.

The data processing systems such as payer device 700, merchant kiosk 600 and acquirer system 120 are coupled in communication with authorization server 300 via communication network 130. Communication network 130 can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks and Worldwide Interoperability for Microwave Access (WiMAX) networks.

During registration, authorization server 300 is configured to receive account information and other registration information from payer device 700 through communication network 130 and to receive account information and other registration information from merchant kiosk 600 through communication network 130. During registration, authorization server 300 is further configured to forward, through communication network 130, account information that has been associated with a token to acquirer system 120 for account confirmation. During registration, the authorization server 300 is configured to receive account confirmation from acquirer system 120 through communication network 130 for either the payer or the merchant.

During authorization, through communication network 130, authorization server 300 is configured to receive data from payer device 700 and approval codes from acquirer system 120. During authorization, through communication network 130, authorization server 300 is configured to send approval codes or fraud notifications/warnings to payer device 700 and/or merchant kiosk 600.

In an example, payer device 700 and merchant kiosk 600 are mutually coupled in communication through means other than communication network 130 including but not limited to wireless connection, paired connection, peer-to-peer connection, wired connection, airdrop, a virtual private network (VPN) 140 tunnelling through communication network 130 or a communication network (not shown) independent from communication network 130.

The network environment is suitable for implementing various systems for payment authorization and, in a particular example, payer-controlled payment authorization. In order to implement a system for payment authorization, server 300 provides a payment authorization service to payer device 700, merchant kiosk 600 and acquirer system 120, while authorization database 110 stores data related to the payment authorization, transactions, merchants, payers, accountholders, cardholders, etc. In an example, neither authorization server 300 nor authorization database 110 stores payer account numbers, account information, card numbers or card information usable by entities unregistered within records of authorization server 300 and/or authorization database 110.

Payer device 700 and merchant kiosk 600 may access authorization server 300 to download one or more software products associated with the payment authorization service, for example, during a registration process. In an example, such a software product may not be downloaded by merchant kiosk 600 unless approved by authorization server 300 based upon one or more account confirmation analyses. In one embodiment, payment authorization systems are arranged in a manner that functionality is implemented partly in payer device 700 and merchant kiosk 600 and partly in authorization server 300.

Payer device 700 and merchant kiosk 600 may be coupled to authorization server 300 periodically or randomly from time to time, for example, to receive updates therefrom and/or to upload status thereto.

Users associated with payer device 700 and merchant kiosk 600 use the payment authorization service. Accordingly, payer devices 700 may be used, operated, or carried by payers, accountholders or cardholders, while merchant kiosks 600 may be used, operated, or carried by merchants, merchant employees or other entities.

Authorization server 300 may store registration information, transaction requests, merchant identification, authorization and/or approval codes in authorization database 110. Payer identification as well as payer tokens may also be stored by authorization server 300 in authorization database 110. In an example, each of several payer tokens linked with a given payer in authorization database 110 is associated with a separate account of that payer. Moreover, authorization database 110 includes a non-transient data storage medium. Additionally or alternatively, various data may be stored in a relational database accessible to authorization server 300.

Payment authorization services implemented through the network environment can be offered free of cost or can be a paid service that has a subscription-based billing or a transaction-based billing, such as pay-per-use and pay-per-feature.

The network environment is described as an example and is not to be construed as limiting the network environment to specific numbers, types, or arrangements of data processing units, data processing systems, servers, databases and communication networks. A person skilled in the art will recognize many variations, alternatives, and modifications of embodiments of the disclosure.

Figure 2:
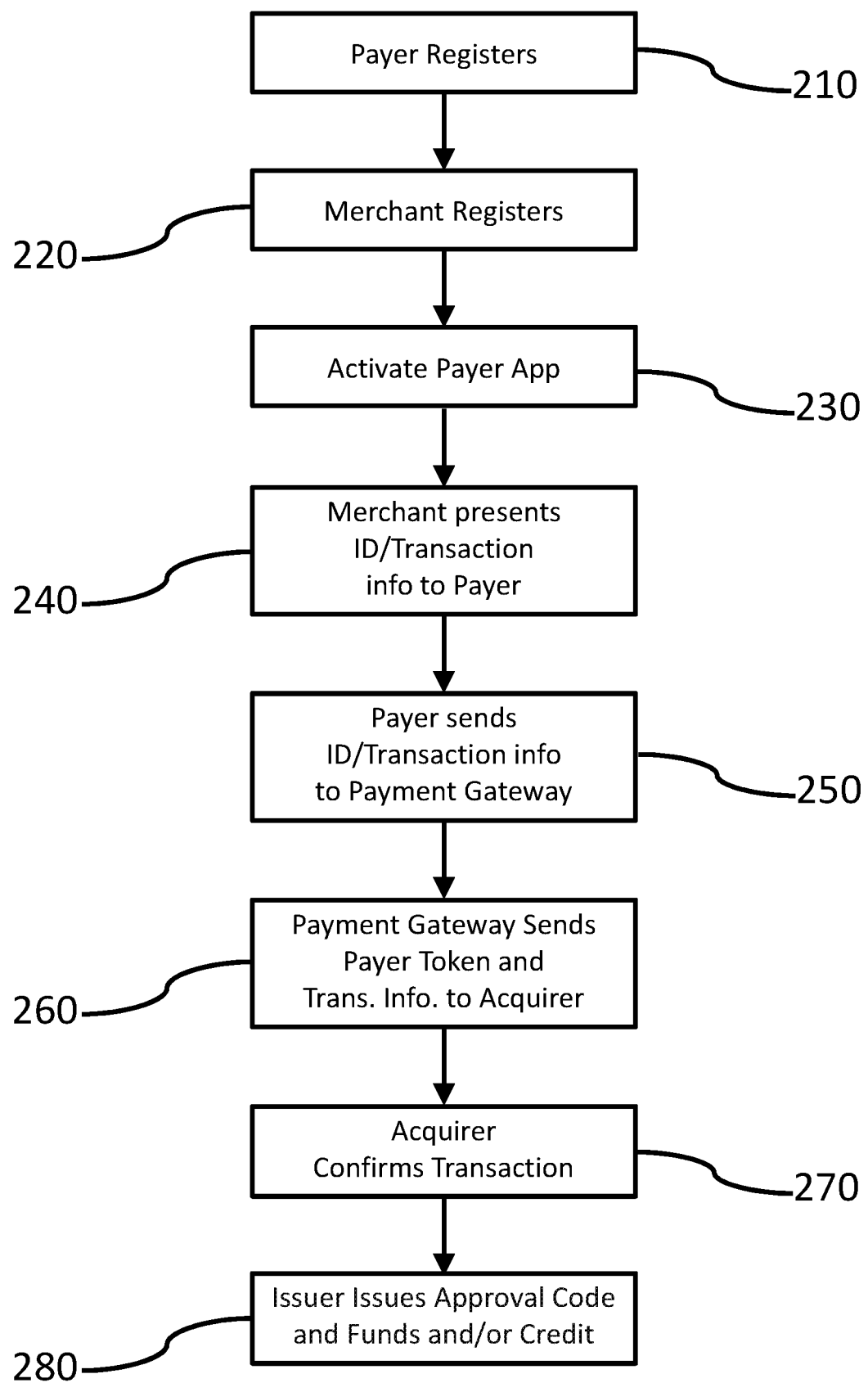
FIG. 2 illustrates an example flow of a method for payment authorization.

FIG. 2 is an illustration of actions of an example method for payment authorization, in accordance with an embodiment of the disclosure and suitable for providing a payer-controlled payment processing service. The method is depicted as a collection of actions in a logical flow diagram, which represents a sequence of actions that may be computer-implemented such as in hardware, software, or a combination thereof.

During an initialization or registration phase, a payer device which may also be a cardholder device or an accountholder device is registered with a payer identification and a payer account. In an example, a credit card number or account number may be received from the payer device and associated with the payer account. In another example, the credit card or account number is deleted after being associated with the payer account.

A payer may use a data processing system such as a payer device 700 to download a payer application and register the application through the device to pair the device with a particular payer at 210. As set forth above, authorization server 300 receives account confirmation from acquirer system 120 through communication network 130 for the payer. At 220, a merchant may file for approval to register as a merchant for the payment processing service. As set forth above, authorization server 300 receives account confirmation from acquirer system 120 through communication network 130 for the merchant. Upon receipt of the appropriate confirmation, the merchant may download a merchant application with a merchant data processing system such as a merchant kiosk 600. The merchant application, merchant kiosk 600 and the merchant are thereby associated together.

Actions 210 and 220, in particular, may occur in a different order from that shown by way of example in FIG. 1 and the order has no bearing on the ability of following actions to be performed except that one or more of actions 230-280 may depend on actions 210 and/or 220, regardless of order. In operation, there is ongoing registration from both payers and merchants and any number of payers or merchants may register.

The payer may activate the application at 230, for example, using a passcode and/or a biometric authentication when he or she is ready to pay. Activating the application prepares payer device 700 to receive from the merchant by way of merchant kiosk 600, an encrypted message. The encrypted message may contain identifying merchant information, transaction information, a merchant IP address, a security key or any combination of these. The payer device 700 may be configured to receive the encrypted message from the merchant kiosk 600 via the VPN 140. Transaction security may be improved, and the probability of fraud reduced by communicatively coupling the payer device 700 and the merchant kiosk 600 via the VPN 140 which may be configured to provide a secure communication channel independent from the communication network 130. It will be appreciated from at least FIG. 1 that the secure communication channel provided by the VPN 140, communicatively couples only payer device 700 and merchant kiosk 600. In view of the disclosure herein, it will be understood by one of ordinary skill in the art, that the secure communication channel provided by the VPN 140 is dedicated exclusively to communication between an exemplary payer device 700 and an exemplary merchant kiosk 600 during payer initiation of a transaction phase after a previous registration phase. For example, the encrypted message received by the payer device 700 from the merchant kiosk 600 via the VPN 140 during the payer-initiated transaction phase may comprise identifying merchant information, transaction information, a merchant IP address, a security key and/or any combination of these, wherein the merchant kiosk 600 received the security key from the authorization server 300 during a registration phase prior to the transaction phase. Transaction security may be further improved, and the probability of fraud further reduced with the additional layer of security and authentication provided by the VPN 140 configured between the merchant kiosk 600 and the payer device 700. For example, persons of ordinary skill would recognize the merchant kiosk 600 and payer device 700 communication endpoints would be authenticated and, the merchant information, transaction information and security key received by the payer device 700 from the merchant kiosk 600 would be further protected by the additional layer of cryptographically secure authentication and encryption functions of the VPN 140. Persons of ordinary skill would recognize the additional layer of cryptographically secure authentication and encryption functions of the VPN 140 enhance the security of communication between the payer device 700 and the merchant kiosk 600 to further protect the merchant information, transaction information and security key received by the payer device 700 from the merchant kiosk 600 before the merchant information, transaction information and security key are forwarded by the payer device 700 to the authorization server 300 for further validation in accordance with the disclosure herein. This enhanced security and authentication provided by the VPN 140 configured between the merchant kiosk 600 and the payer device 700 may prevent an attacker from capturing useful communication between the merchant kiosk 600 and the payer device 700. The VPN 140 configured between the merchant kiosk 600 and the payer device 700 may prevent an attacker from using captured communication between the merchant kiosk 600 and the payer device 700 in a replay attack. The VPN 140 configured between the merchant kiosk 600 and the payer device 700 may prevent an attacker from maliciously injecting a fraudulent transaction into the distributed payer-controlled payment system 100. For example, persons of ordinary skill would understand the VPN 140 provides a secure connection configured between the merchant kiosk 600 and the payer device 700 to prevent a malicious actor from successfully using, in a replay attack for example, captured network communication comprising transaction information sent by merchant kiosk 600 to payer device 700, and fraudulently injecting a malicious transaction in the replay attack. Persons of ordinary skill would recognize the VPN 140 secure connection configured between the merchant kiosk 600 and the payer device 700 would eliminate any reasonable possibility an attacker could capture useful network traffic from that communication link, that might be useful in a replay attack or other types of attacks known to persons of ordinary skill in the field of communication security. In another illustrative example, the authorization server 300 may be configured to terminate a transaction and send a warning upon determining any of the merchant information, transaction information or security key, received in the encrypted message from merchant kiosk 600 by the payer device 700 via the VPN 140 and forwarded to the authorization server 300 by the payer device 600, are not valid, in accordance with the present disclosure. Persons of ordinary skill would understand the VPN 140 secure connection configured between the merchant kiosk 600 and the payer device 700 improves the security of the distributed payer-controlled payment system 100 for at least the reasons above.

After the payer requests to make a purchase at a merchant point of sale, the merchant presents identifying and/or transaction information and the security key to payer device 700 at 240. Payer device 700 reads the identifying and/or transaction information and the security key from merchant kiosk 600 and sends at least a portion thereof in a secure manner (e.g., in an encrypted form) to authorization server 300. Reading the information may be performed by scanning a bar code or QR code with image-capturing tool such as a camera or by receiving a code transmitted wirelessly using one or more near-field communications beacons or tags or by wired connection from merchant kiosk 600 via the VPN 140, depending on the type of transaction for example, online, physical point of sale, wireless, mail order or telephone order. It will be understood by one of ordinary skill in the art that the payer device 700 may be configured to read the identifying and/or transaction information and the security key from the merchant kiosk 600 using at least one of: the VPN 140, an image-capturing interface comprising a camera, or a near-field communication interface comprising one or more near-field communications beacons or tags, depending on the type of the transaction initiated by the payer. It will be further understood by the disclosure herein, as well as one of ordinary skill in the art, that the payer device 700 may be configured to use at least the VPN 140 to receive the encrypted message from the merchant if the type of the transaction is online; use at least the image-capturing interface to receive the encrypted message from the merchant if the type of the transaction is physical point of sale; and/or use at least the near-field communication interface to receive the encrypted message from the merchant if the type of the transaction is wireless.

In an example, one or more of the identifying information, the transaction information and the security key are presented by the merchant by one or more near-field communications beacons or tags. For example, the payer may scan or otherwise select one or more goods or services for purchase and receive merchant and transaction information from a beacon or tag and automatically pay as each good or service is identified or at the time of leaving a physical point of sale.

In each of the above implementations, payer device 700 does not need to provide payment information to merchant kiosk 600. Instead, once a purchase request has been made to the merchant, the identifying and/or transaction information and the security key may be presented to payer device 700, for example, in the form of a QR code. Once the identifying and/or transaction information is received, the payer may commit to the purchase and complete the transaction by clicking on a "Confirm" button of a payer application of payer device 700. In an example, the payer may use a passcode and/or a biometric authentication at the time of confirmation.

After a payer commits to the purchase transaction, the method for payment authorization, includes receiving, at 250, from a payer device registered with a payer identification, merchant identification and transaction information transmitted, at 240, to the payer device from a merchant device registered with the merchant identification and the payer identification. In an example, the payer identification is received from the payer device without receiving payer account information. In another example, the payer identification is received from the payer device without receiving the payer identification from the merchant device. In yet another example, the payer identification is received from the payer device without receiving payer account information and without receiving the payer identification from the merchant device.

Authorization server 300 preferably validates the identifying and/or transaction information and the security key and securely forwards a transaction request to an acquirer system, to be used in a purchase transaction if the identifying and/or transaction information is validated. Authorization server 300 preferably applies one or more validation tests to the information to obtain a level of confidence that both the merchant and the payer are registered for the transaction authorization service. When the one or more validation tests are passed, and preferably with no tests being failed, authorization server 300 forwards a representation of the identifying and/or transaction information on to acquirer system 120 which may include a payment processing network.

In some implementations, authorization server 300 receives information that identifies a merchant (the "merchant identification information" or "merchant identifier") from payer device 700 along with the identification information for payer device 700, and, if valid, securely sends, at 260, the merchant identification, the kiosk identification, a security key, the transaction information, and the payer identification to acquirer system 120. This is known as a transaction request. In an example, authorization server 300 may securely send IP addresses for the merchant and the payer.

Depending upon implementations, the data representative of the identification information sent to acquirer system 120 by authorization server 300 may comprise a portion or all of the received and verified identification information, or may comprise a substitute account number, account name or payer token that is used for the payer in place of the card holder name, card number, payer identification and/or account number in interactions between authorization server 300 and acquirer system 120.

In an example, deriving the transaction request further includes, with the payer identification, retrieving a payer account associated with the payer identification. In an example, deriving the transaction request further includes, with the payer identification, retrieving a payer token associated with the payer identification. In another example, deriving the transaction request further includes assembling the merchant identification, the transaction information and the payer token into the transaction request. In yet another example, deriving the transaction request further includes assembling the transaction information and the payer token into the transaction request without including an account number.

Acquirer system 120 can then perform the actions normally performed to authorize the transaction, such as checking whether the merchant is in good standing, and checking the account limit of the payer to ensure that there are sufficient funds to cover the purchase price of the transaction. The method further includes receiving, at 270, an authorization from acquirer system 120 for a transaction referred to by the transaction information and/or the transaction request.

The method may further include looking up, by acquirer system 120, a payer account number, or card number based upon the transaction request and/or the payer token.

The method further includes, at 280, transmitting transaction approval codes for the transaction to the merchant device based upon the authorization. In an example, the method further includes transmitting transaction approval codes for the transaction to the payer device.

The method may further include transferring funds in an amount reflected by the transaction request from the account of the payer to an account of the merchant when a limit associated with the account of the payer represented with the payer token is equal to or greater than an amount reflected in the transaction request.

The actions described with reference to FIG. 2 are only illustrative and other alternatives can also be provided where one or more actions are added, one or more actions are removed, or one or more actions are provided in a different sequence without departing from the scope of the claims herein.

Figure 3:
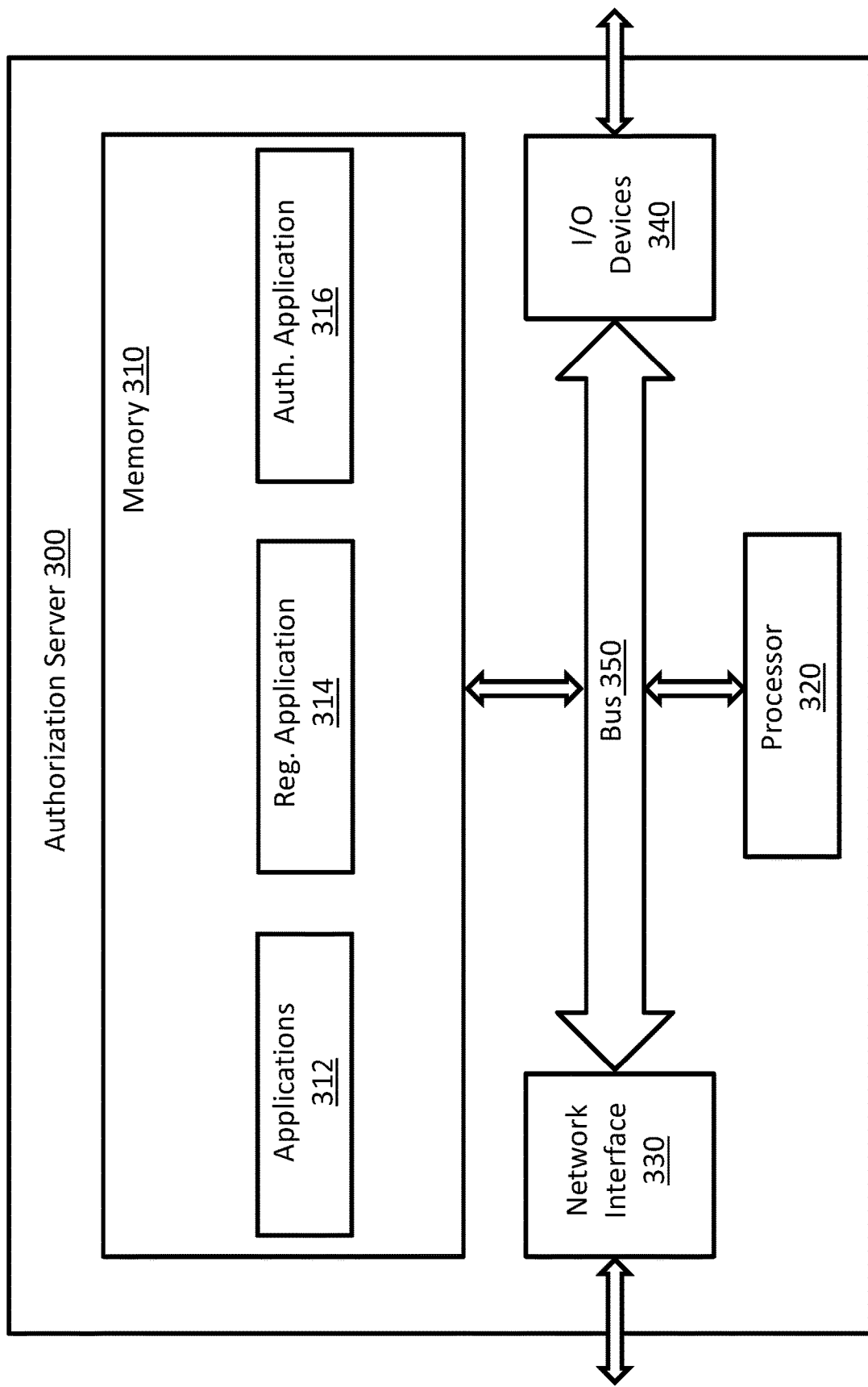
FIG. 3 schematically illustrates an example authorization server.

FIG. 3 schematically illustrates an example authorization server suitable for performing disclosed payment authorization methods as part of a payment authorization system. Authorization server 300, in accordance with an embodiment of the disclosure includes, but is not limited to, a memory 310, computing hardware such as a processor 320, Input/Output (I/O) devices 340, a network interface 330, and a system bus 350 that operatively couples various components including memory 310, processor 320, I/O devices 340 and network interface 330. Authorization server 300 also includes a power source for supplying electrical power to the various components of authorization server 300. The power source may, for example, include a rechargeable battery.

Memory 310 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

Memory 310 stores a registration application 314, an authentication application 316 and a variety of other applications 312. Registration application 314, authentication application 316 and other applications 312 may include software products having computer-readable instructions causing authentication server 300 to perform various tasks. In the case of the registration application 314 and the authentication application 316, the software products and/or computer-readable program products are associated with the payment authorization service provided by server 300. Executing software products on processor 320 causes processor 320 to perform various actions of disclosed payment authorization methods.

Registration application 314 configures authorization server 300 to receive payer account information confirmation from acquirer system 120 and register the payer and or payer application with a payer device as set forth above in descriptions of FIG. 2. Further, registration application 314 configures authorization server 300 to receive merchant account information confirmation from acquirer system 120 and register the merchant and or merchant application with a payer device as set forth above in descriptions of FIG. 2.

I/O devices 340 may include a display screen for presenting graphical images to a user of authorization server 300. In some examples, the display screen may be a touch-sensitive display screen that is operable to receive tactile inputs from the user. These tactile inputs may, for example, include clicking, tapping, pointing, moving, pressing and/or swiping with a finger or a touch-sensitive object like a pen. Further, executing the software products may result in generating and rendering a graphical user interface on a display screen of I/O devices 340. The graphical user interface is configured to facilitate user interactions with the payment authorization server.

Additionally or alternatively, I/O devices 340 include a mouse or a joystick that is operable to receive inputs corresponding to clicking, pointing, and/or moving a pointer object on the graphical user interface. I/O devices 340 may also include a keyboard that is operable to receive inputs corresponding to pushing certain buttons on the keyboard. Additionally, I/O devices 340 may also include a microphone for receiving an audio input from the user, and a speaker for providing an audio output to the user.

The software products, when executed on processor 320, cause processor 320 and/or memory 310 to couple with authorization database 110 and are configured to substantially continuously record and update authorization, transaction requests and/or approval codes in authorization database 110. The software products, when executed on processor 320, are optionally configured to return authorization server 300 to its last updated status in authorization database 110, in case of interruptions in the operable state of authorization server 300 or its associated components.

Additionally, the software products, when executed on processor 320, may store registration information, transaction requests, merchant identification, payer identification, authorization and/or approval codes in authorization database 110.

Furthermore, network interface 330 optionally allows authorization server 300 to receive registration information, transaction requests, merchant identification, payer identification, security keys, authorization reports and to transmit transaction requests and authorization notices, for example, via communication network 130. Moreover, network interface 330 optionally allows authorization server 300 to communicate with other data processing systems, for example, via communication network 130.

Authorization server 300 is configured, for example by software products such as authorization application 316, to receive, from a payer device, merchant identification, kiosk identification identifying a merchant kiosk, a security key and transaction information transmitted to the payer device from a merchant device registered with the merchant identification and payer identification associated with the payer device. Authorization server 300 may be further configured to receive, from the payer device, other data including, for example transaction date and time, merchant IP address and/or payer IP address. Further, kiosk identification may include a device serial number associated with the kiosk.

Authorization server 300 may be configured to receive the payer identification directly from the payer device without receiving the payer identification from the merchant kiosk. In an example, authorization server 300 is configured to not receive any transmission directly from a merchant kiosk except during registration for use of disclosed payment processing services. In another example, authorization server 300 may be configured to refuse any direct transmission from any merchant kiosk except during registration.

The merchant identification, the kiosk identification, the security key, and the transaction information may be received by authorization server 300 packaged into a QR code or QR purchase code.

Authorization server 300 is further configured, for example by software products such as an authorization application 316, to validate the merchant identification, the kiosk identification, the payer identification and the security key when the merchant identification is registered with the kiosk identification in an authorization database, the payer identification is registered in the authorization database and the security key is valid.

Authorization server 300, for example by way of processor 320 and authorization application 316, is configured to derive a transaction request from the validated merchant identification, the payer identification and the transaction information. Authorization server 300 is configured to transmit the derived transaction request to an acquirer system.

Authorization server 300 may be configured, for example by software products such as authorization application 316, to transmit a fraud notification to the payer device and/or the merchant kiosk when the merchant identification is not registered with the kiosk identification in an authorization database, the payer identification is not registered in the authorization database, the security key is invalid or any combination of these.

In an example, the payer identification is excluded from the derivation of the transaction request. Instead, the payer token registered with or otherwise associated with the payer identification in the authorization server database is included in the transaction request, offering an alternative manner of identifying the payer.

Authorization server 300 receives, for example through network interface 330 an authorization report for a transaction referred to by the transaction information based upon the transaction request. The authorization report may be sent from an acquirer system which has processed the transaction request from authorization server 300.

Authorization reports received by authorization server 300 may reflect an approval when a limit associated with an account matched with the payer token in a storage of the acquirer system is equal to or greater than an amount reflected by the transaction information. Correspondingly, authorization reports received by authorization server 300 may reflect a denial when a limit associated with an account matched with the payer token in a database of the acquirer system is less than an amount reflected by the transaction information.

Authorization server 300 may be configured for example by software products such as authorization application 316, to send an authorization notification to the merchant kiosk based upon the authorization report and send an authorization notification to the payer device based upon the authorization report. In an example, authorization notifications include approval codes including but not limited to approval codes received as part of the authorization report(s).

Authorization server 300 may be configured to not transmit account numbers and/or card numbers of the payer. In an example, neither account numbers nor card numbers of the payer are in the possession of authorization server 300 during payment authorization services or associated transactions.

Authorization server 300 is optionally implemented by any of a variety of: a tablet computer, a PC, a laptop computer, a desktop computer and an NAS device.

Figure 4:
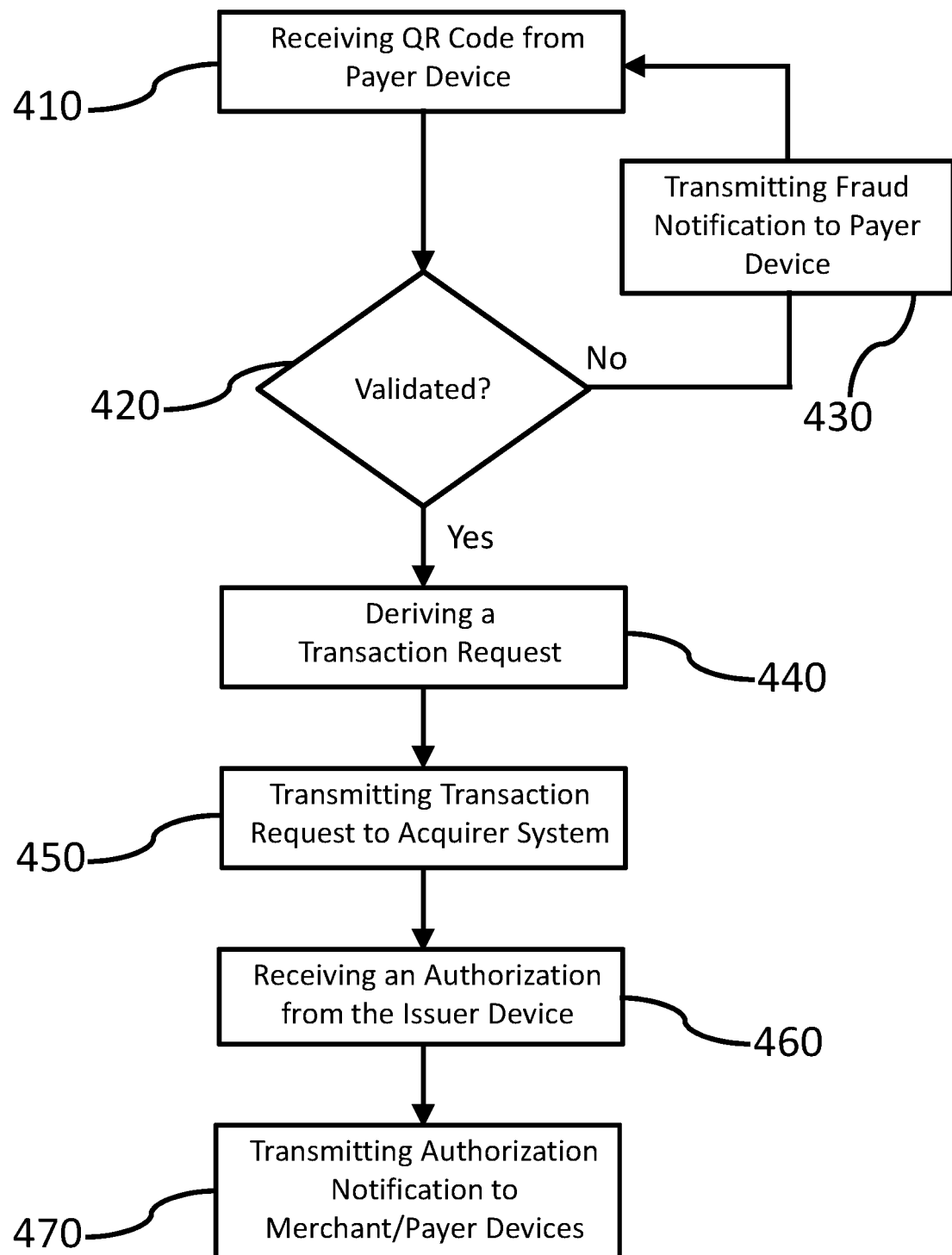
FIG. 4 illustrates an example flow of an authorization server method.

FIG. 4 illustrates an example flow of an authentication server method. The method is depicted as a collection of actions in a logical flow diagram, which represents a sequence of actions that may be computer-implemented such as in hardware, software, or a combination thereof and may be suitable for providing a payer-controlled payment processing service. In an example, disclosed actions may be implemented, in part, by authorization server 300.

The method includes receiving from a payer device, at 410, merchant identification, kiosk identification identifying a merchant kiosk, a security key and transaction information all of which have been previously transmitted to the payer device from a merchant device registered with the merchant identification. Further, payer identification associated with the payer device is also received from the payer device. In an example, a date and/or time are also received from the payer device. The date and/or time may be provided by the merchant kiosk at the same time other transaction information is provided or may be determined in another manner. In another example the method includes receiving a merchant IP address and a payer IP address the payer device.

The merchant identification, kiosk identification, the security key, and the transaction information may be packaged into or otherwise represented in a single object, for example, a QR code or a transmitted code.

Again, because payer identification is transmitted by or received from the payer device, it is unnecessary that the payer identification be transmitted by or received from the merchant kiosk and, as such, in an example, the merchant and/or the merchant kiosk is/are not in possession of the payer identification.

The method further includes, at 420, validating the objects received from payer device 700. Authorization server 300 compares incoming objects it receives from payer device 700 (such as by looking at account numbers), and can match (e.g., correlate) incoming objects with validation information obtained during registration. For example, authorization server 300 may compare incoming codes with validation information.

Figure 5:
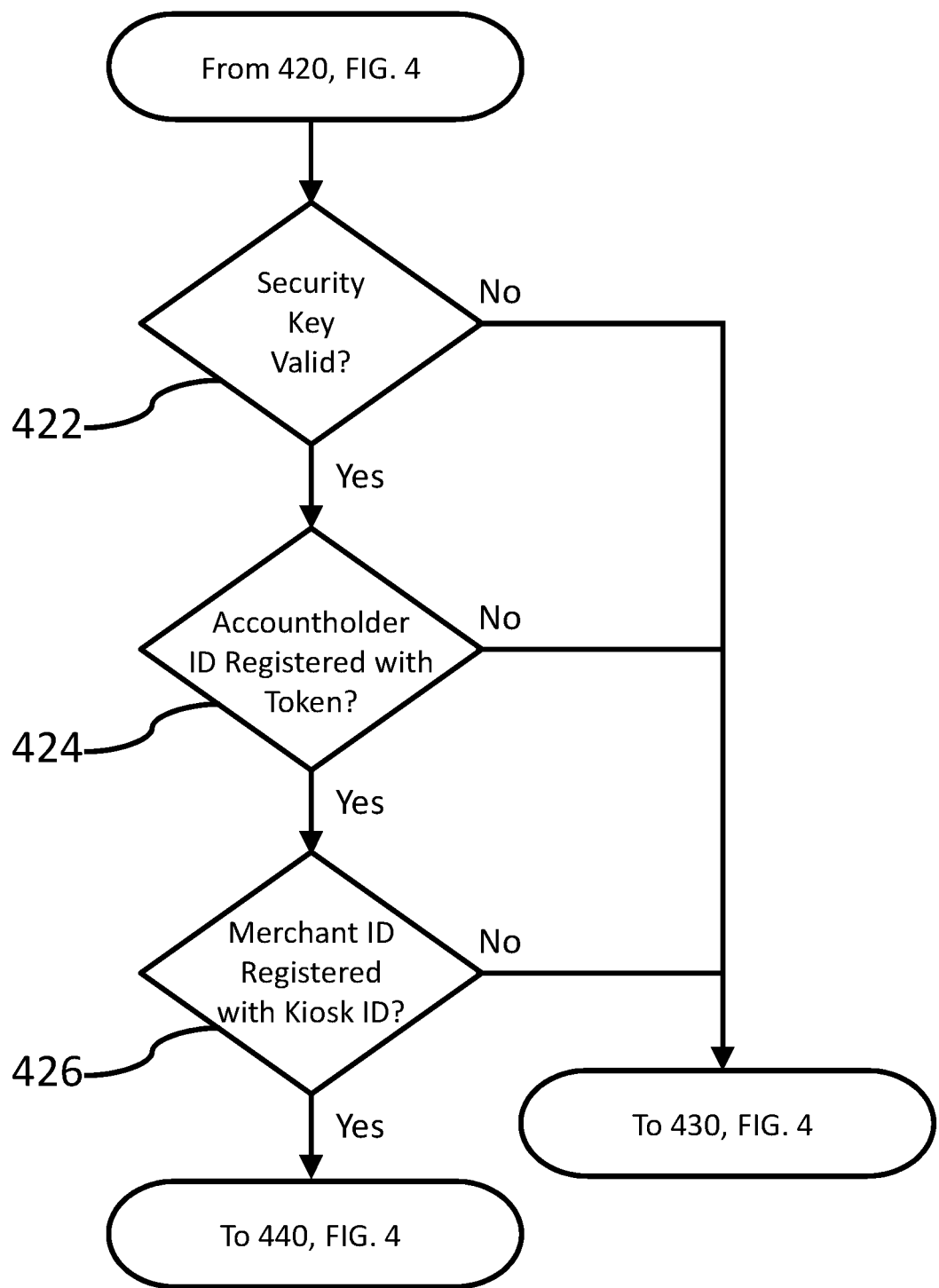
FIG. 5 illustrates an example flow detail of the method of FIG. 4.

FIG. 5 illustrates an example detail flow of the method of FIG. 4. The method is depicted as a collection of actions in a logical flow diagram, which represents a sequence of actions that may be computer-implemented such as in hardware, software, or a combination thereof. In an example, disclosed actions may be implemented, in part, by authorization server 300.

A primary validation test that authorization server 300 may apply pertains to verifying that the code is authentic. For this, authorization server 300 may have a database of security keys. The first validation test may include, at 422, checking that or determining whether one or more of the security keys validate the code. In an example, the security key is a base form, core or kernel of a general code which underlies all codes exchanged between merchants, payers and payment processing servers for the purposes of processing payments for transactions. If a code does not include the base form core or kernel, it will not be validated by any security keys and the first validation test may be deemed to have been failed. In an example, such validation tests may be applied to bar codes, QR codes and/or beacon-transmitted codes.

Secondary validation tests that authorization server 300 may apply pertain to verifying that transaction is authentic. For this authorization server 300 may also have a database of merchant IDs, kiosk IDs, payer identification and tokens, and can validate that the payer device has sent a merchant ID that is registered with the kiosk ID and a payer identification registered with one or more stored payer tokens. At 424, it is determined whether the payer identification is registered with a payer token in authorization database 110. It is determined, at 426, whether the merchant identification is registered with the kiosk identification in authorization database 110. Validation of transaction serves to authenticate the transaction. If a validation test is failed, authorization server 300 may record the identification of the failed merchant kiosk and the source IP address and/or MAC address from which the payer device made the request in a database.

While depicted as proceeding in a particular order, it should be noted that the validation actions 422, 424 and 426 may be performed in another order. Alternatively, actions 422, 424 and 426 may be performed simultaneously or substantially simultaneously. Nevertheless, if any of the individual validations or any combination thereof fails, at 430 (FIG. 4), a fraud notification may be transmitted to the payer device and/or the merchant kiosk.

Referring again to FIG. 4, when all relevant information is validated, a transaction request is derived from the validated merchant identification, the payer token with which the payer identification is registered and the transaction information for a transaction referred to by the transaction information, at 440.

At 450, the method may further include transmitting the transaction request to an acquirer system. In an example, the payer identification is not transmitted to or is otherwise withheld from the acquirer system. Instead, a payer token registered with or otherwise associated with the payer identification in authorization database 110 is presented to the acquirer system, offering an alternative manner of identifying the payer. In a high security embodiment, neither account numbers, nor card numbers are transmitted during the payment authorization method between any of the merchant kiosk, the payer device, the authorization server or the acquirer system.

At 460, an authorization report is received from the acquirer system based upon the transaction request. The received authorization report reflects approval when a limit associated with an account matched with the payer token in a database of the acquirer system is equal to or greater than an amount reflected in the transaction information. Correspondingly, the received authorization report reflects denial when a limit associated with an account matched with the payer token in a database of the acquirer system is less than an amount reflected in the transaction information.

At 470, the method may further include transmitting or otherwise sending an authorization notification to the merchant kiosk based upon the authorization report and/or sending an authorization notification to the payer device based upon the authorization report.

In an example, if the authorization report received by authentication server 300 reflects an approval, the authorization notification sent to the merchant kiosk will show that the transaction referred to in the transaction information was successful and the funds required by the transaction have been directed to one or more accounts of the merchant. Similarly, if the authorization report received by authentication server 300 reflects an approval, the authorization notification sent to the payer device will show that the transaction referred to in the transaction information was successful and the funds required by the transaction have been directed from one or more accounts of the payer.

In another example, if the authorization report received by authentication server 300 reflects a denial, the authorization notification sent to the merchant kiosk with show that the transaction referred to in the transaction information was unsuccessful and the funds required by the transaction have not been directed to any accounts of the merchant. Similarly, if the authorization report received by authentication server 300 reflects a denial, the authorization notification sent to the payer device will show that the transaction referred to in the transaction information was unsuccessful and the funds required by the transaction have not been directed from any accounts of the payer.

In yet another example, if the authorization report received by authentication server 300 reflects a denial, the authorization notification sent to the payer device will show that the transaction referred to in the transaction information was unsuccessful and will invite the payer to choose a different payment account or payment card for completing the transaction and attempt to authorize the transaction with that account or card. However, the merchant may not receive the authorization notification in the event of a denial, may receive an authorization notification only after two or more authorization attempts or may receive an authorization notification including a payer-chosen message such as, "changing payment account" or "changing payment card."

Embodiments of the disclosure provide a computer program product that includes a non-transitory or non-transient computer-readable storage medium storing computer-executable code for payment authorization. The code, when executed, is configured to perform the actions of the method as described in conjunction with FIGS. 4 & 5. As actions of the disclosed methods may be provided in different sequences, so the computer-executable code may be configured to provide a service having a different sequence of actions from those illustrated in FIGS. 4 & 5. In some examples, the code may be downloaded from a software application store, for example, from an "App store", to a data processing unit. In an example, the code is implemented as registration application 314 and/or authorization application 316.

The code, when executed, is configured to cause one or more computers such as authorization server 300 to receive, from a device such as payer device 700: merchant identification, kiosk identification identifying a merchant kiosk, a security key and transaction information transmitted to the payer device from a device registered with the merchant identification and payer identification associated with the payer device. The authorization server 300 may additionally receive a merchant IP address and/or a payer IP address.

The code, when executed, is further configured to cause one or more computers to validate the merchant identification, the kiosk identification, the payer identification and the security key when the merchant identification is registered with the kiosk identification in an authorization database, the payer identification is registered with a payer token in the authorization database and the security key is valid. The code, when executed, if further configured to cause the one or more computers to derive a transaction request from the validated merchant identification, the payer token with which the payer identification is registered and the transaction information. For a transaction referred to by the transaction information, the code, when executed is configured to cause the one or more computers to receive, from an acquirer system 120, an authorization report based upon the transaction request.

The code configured to cause one or more computers to receive the merchant identification, the kiosk identification, the security key, the transaction information transmitted and the payer identification may be further configured to cause the one or more computers to receive a date and time.

The code configured to cause one or more computers to receive the payer identification from the payer device is further configured to cause the one or more computers to refuse payer identification from the merchant kiosk.

The code, when executed, may be further configured to cause one or more computers to withhold the payer identification from the acquirer system. The code, when executed, may be configured to cause one or more computers to withhold account numbers and card numbers.

The code configured to cause one or more computers to receive an authorization report may be further configured to cause the one or more computers to receive an authorization report reflecting approval when a limit associated with an account matched with the payer token in a database of the acquirer system is equal to or greater than an amount reflected in the transaction information.

The code configured to cause one or more computers to receive an authorization report may be further configured to cause the one or more computers to receive an authorization report reflecting denial when a limit associated with an account matched with the payer token in a database of the acquirer system is less than an amount reflected in the transaction information.

Further, the code, when executed, may be configured to cause one or more computers to send an authorization notification to the merchant kiosk based upon the authorization report and send an authorization notification to the payer device based upon the authorization report.

Further, the code, when executed, may be configured to cause one or more computers to transmit a fraud notification to the payer device and/or the merchant kiosk when the merchant identification is not registered with the kiosk identification in an authorization database, the payer identification is not registered with a payer token in the authorization database, the security key is invalid or any combination of these.

Figure 6:
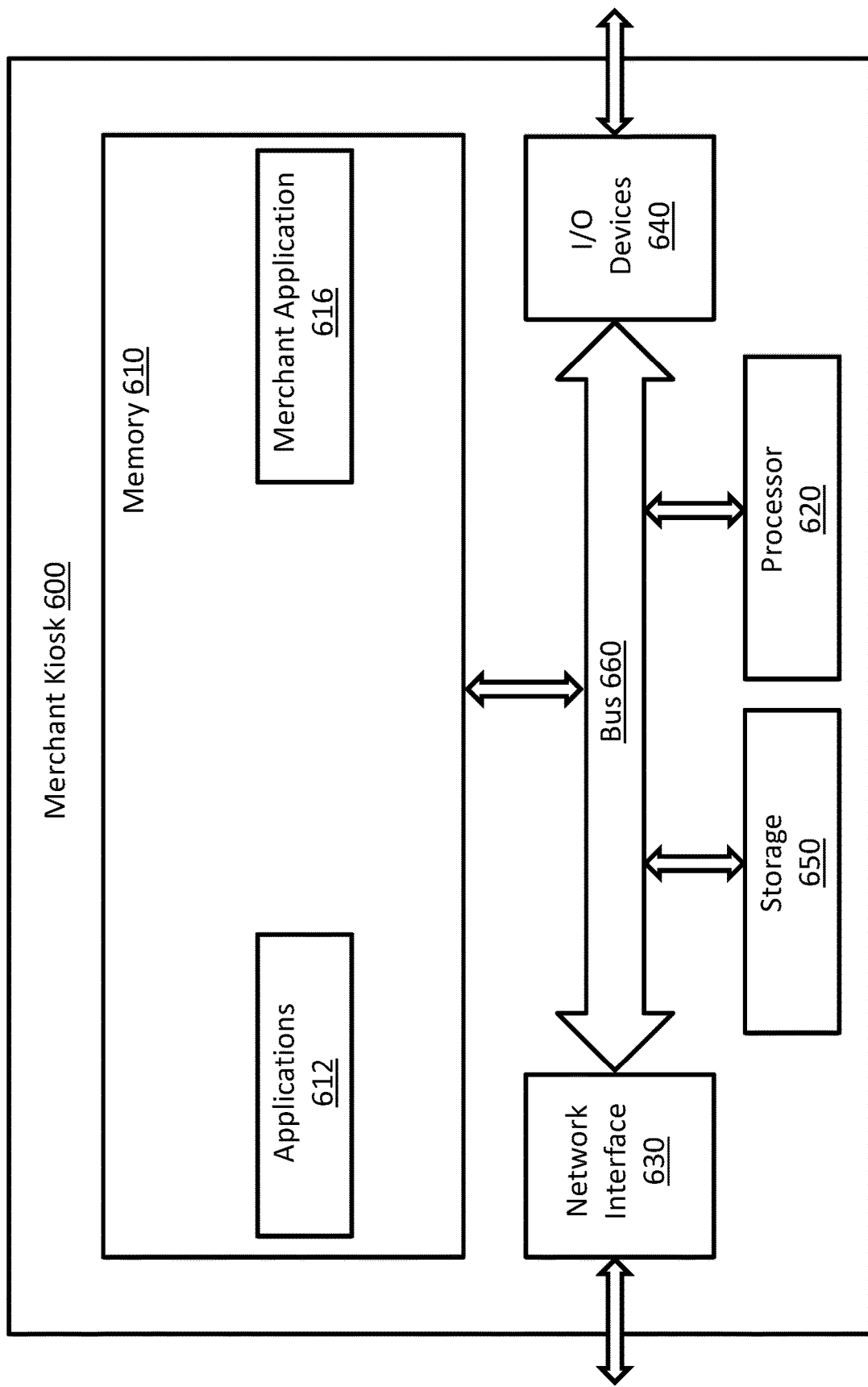
FIG. 6 schematically illustrates an example merchant kiosk.

FIG. 6 schematically illustrates an example merchant kiosk 600. Merchant kiosk 600, in accordance with an embodiment of the disclosure includes, but is not limited to, a memory 610, computing hardware such as a processor 620, Input/Output (I/O) devices 640, a network interface 630, a storage 650 and a system bus 660 that operatively couples various components including memory 610, processor 620, network interface 630, I/O devices 640 and storage 650. Merchant kiosk 600 also includes a power source for supplying electrical power to the various components of kiosk 600. The power source may, for example, include a rechargeable battery.

Memory 610 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

Memory 610 stores a merchant application 616 and a variety of other applications 612. Merchant application 616 and other applications 612 may include software products or computer-readable program products causing merchant kiosk 600 to perform various tasks. In the case of the merchant application 616, the software products and/or computer-readable program products are associated with the payment authorization service provided, in part, by kiosk 600. Executing software products on processor 620 results in performing various actions of disclosed payment authorization methods.

I/O devices 640 may include a display screen for presenting graphical images to a user of merchant kiosk 600. In some examples, the display screen may be a touch-sensitive display screen that is operable to receive tactile inputs from the user. These tactile inputs may, for example, include clicking, tapping, pointing, moving, pressing and/or swiping with a finger or a touch-sensitive object like a pen. Further, executing the software products may result in generating and rendering a graphical user interface on the display screen. The graphical user interface is configured to facilitate user interactions with the payment authorization service.

Additionally or alternatively, I/O devices 640 include a mouse or a joystick that is operable to receive inputs corresponding to clicking, pointing, and/or moving a pointer object on the graphical user interface. I/O devices 640 may also include a keyboard that is operable to receive inputs corresponding to pushing certain buttons on the keyboard. Additionally, I/O devices 640 may also include a microphone for receiving an audio input from the user, and a speaker for providing an audio output to the user.

Moreover, storage 650 is a non-transient data storage medium. Additionally, the software products, when executed on processor 620, may store registration information, merchant identification, authorization and/or approval codes in storage 650. The software products, when executed on processor 620, are optionally configured to record last updated status of merchant kiosk 600 in storage 650, in case of interruptions in the operable state of merchant kiosk 600.

Furthermore, network interface 630 optionally allows merchant kiosk 600 to transmit or upload registration information, merchant identification, security keys, and transaction information and to receive merchant identification, security keys, transaction information and authorization notices, for example, via communication network 130. Additionally, network interface 630 may allow merchant kiosk 600 to access communication network 130 to update the software products and/or download one or more new software products associated with the payment authorization service. Moreover, network interface 630 optionally allows kiosk 600 to communicate with other data processing systems, for example, via communication network 130.

In an example, merchant kiosk 600 additionally or alternatively includes one or more near-field communications beacons or tags configured to present one or more of the merchant identifying information, the transaction information and the security key to the payer.

Merchant kiosk 600 is optionally implemented by way of at least one of: a mobile phone, a smart telephone, an MID, a tablet computer, a UMPC, a phablet computer, a PDA, a web pad, a handheld PC, and an interactive entertainment device, such as a game console, a TV set and an STB.

At the time of a transaction for one or more merchant goods or services, merchant kiosk 600 is configured to package or otherwise assemble several objects into a single object for transmission to a payer device. For example, merchant kiosk 600 may be configured to package merchant identification, kiosk identification identifying the merchant kiosk, a security key, a merchant IP address and transaction information into a QR code for reading or other interpreting by a payer device. Packaging of the several objects into a single object by merchant kiosk 600 may be performed by processing unit 620 according to computer-readable instructions included with merchant application 616.

Merchant kiosk 600 may also be configured to receive, through network interface 630, an authorization notification from the authorization server based upon the authorization report received thereby.

Figure 7:
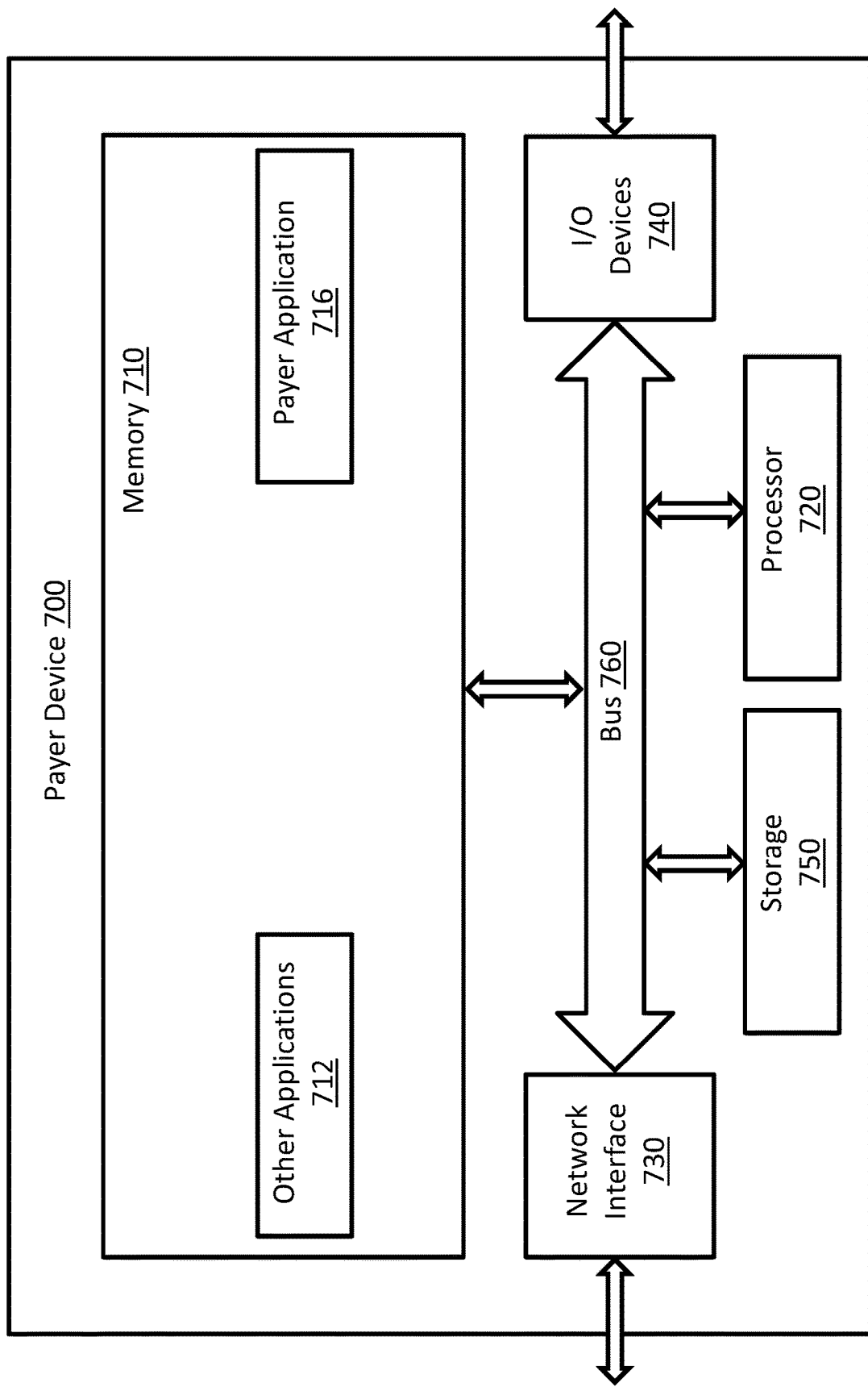
FIG. 7 schematically illustrates an example payer device.

FIG. 7 schematically illustrates an example payer device suitable for performing disclosed methods as part of a payment authorization system. Payer device 700, in accordance with an embodiment of the disclosure includes, but is not limited to, a memory 710, computing hardware such as a processor 720, Input/Output (I/O) devices 740, a network interface 730, a storage 750 and a system bus 760 that operatively couples various components including memory 710, processor 720, network interface 730, I/O devices 740 and storage 750. Payer device 700 also includes a power source for supplying electrical power to the various components of device 700. The power source may, for example, include a rechargeable battery.

Memory 710 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

Memory 710 stores a payer application 716 and a variety of other applications 712. Payer application 716 and other applications 712 may include software products having computer-readable program products causing payer device 700 to perform various tasks. In the case of the payer application 716, the software products and/or computer-readable program products are associated with the transaction validation service provided by device 700 and the payment authorization service provided, in part, by device 700. Executing software products on processor 720 results in performing various actions of disclosed payment authorization methods and/or disclosed transaction validation methods.

I/O devices 740 may include a display screen for presenting graphical images to a user of payer device 700. In some examples, the display screen may be a touch-sensitive display screen that is operable to receive tactile inputs from the user. These tactile inputs may, for example, include clicking, tapping, pointing, moving, pressing and/or swiping with a finger or a touch-sensitive object like a pen. Further, executing the software products may result in generating and rendering a graphical user interface on the display screen. The graphical user interface is configured to facilitate payer interactions with the payment authorization service and/or the transaction validation service.

Additionally or alternatively, I/O devices 740 include a mouse or a joystick that is operable to receive inputs corresponding to clicking, pointing, and/or moving a pointer object on the graphical user interface. I/O devices 740 may also include a keyboard that is operable to receive inputs corresponding to pushing certain buttons on the keyboard. Additionally, I/O devices 740 may also include a microphone for receiving an audio input from the user, and a speaker for providing an audio output to the user.

Additionally, the software products, when executed on processor 720, may store registration information, merchant identification, payer identification, security keys, authorization and/or approval codes in storage 750.

Furthermore, network interface 730 optionally allows device 700 to transmit or upload registration information, merchant identification, payer identification, security key, and transaction information and to receive merchant identification, security keys, transaction information and authorization notices, for example, via communication network 130. Additionally, network interface 730 may allow device 700 to access the communication network to update the software products and/or download one or more new software products associated with the payment authorization service and/or transaction validation service. Moreover, network interface 730 optionally allows device 700 to communicate with other data processing systems, for example, via communication network 130.

In an example, payer device 700 is additionally or alternatively configured to receive and translate one or more of the merchant identifying information, the transaction information and the security key from one or more near-field communications beacons or tags of merchant kiosk 600.

Payer device 700 is optionally implemented by way of at least one of: a mobile phone, a smart telephone, an MID, a tablet computer, a UMPC, a phablet computer, a PDA, a web pad and a handheld PC.

Payer device 700 is configured, for example by a payer application 716, to receive, merchant identification, kiosk identification identifying the merchant kiosk, a security key and transaction information through utilization of network interface 730. Payer device 700 may be further configured to receive a merchant IP address.

Further, payer device 700 is configured for example by a payer application 716, to transmit, to an authorization server: the merchant identification, the kiosk identification, the security key and the transaction information and payer identification associated with payer device 700 in an authorization database of the authorization server. With these items, the authentication server may perform a validation of a transaction referred to by the transaction information.

Payer device 700 is configured to transmit the merchant identification, the kiosk identification, the security key, the transaction information and the payer identification without payer account numbers or card numbers. In an example, account numbers and/or card numbers of the payer are not in the possession or custody of payer device 700, for example, in memory 710 or storage 750.

Payer device 700 may be configured, for example by a payer application 716, to receive a fraud notification when the transaction referred to by the transaction information is not validated by the authorization server.

Payer device 700 is configured for example by a payer application 716, to receive an authorization notification based upon an authorization report received by the authorization server for a transaction referred to by the transaction information. The received authorization notification reflects approval of a transaction referred to by the transaction information when a limit associated with a payer account is equal to or greater than an amount reflected in the transaction information. The received authorization notification reflects denial of a transaction referred to by the transaction information when a limit associated with a payer account is less than an amount reflected in the transaction information.

Figure 8:
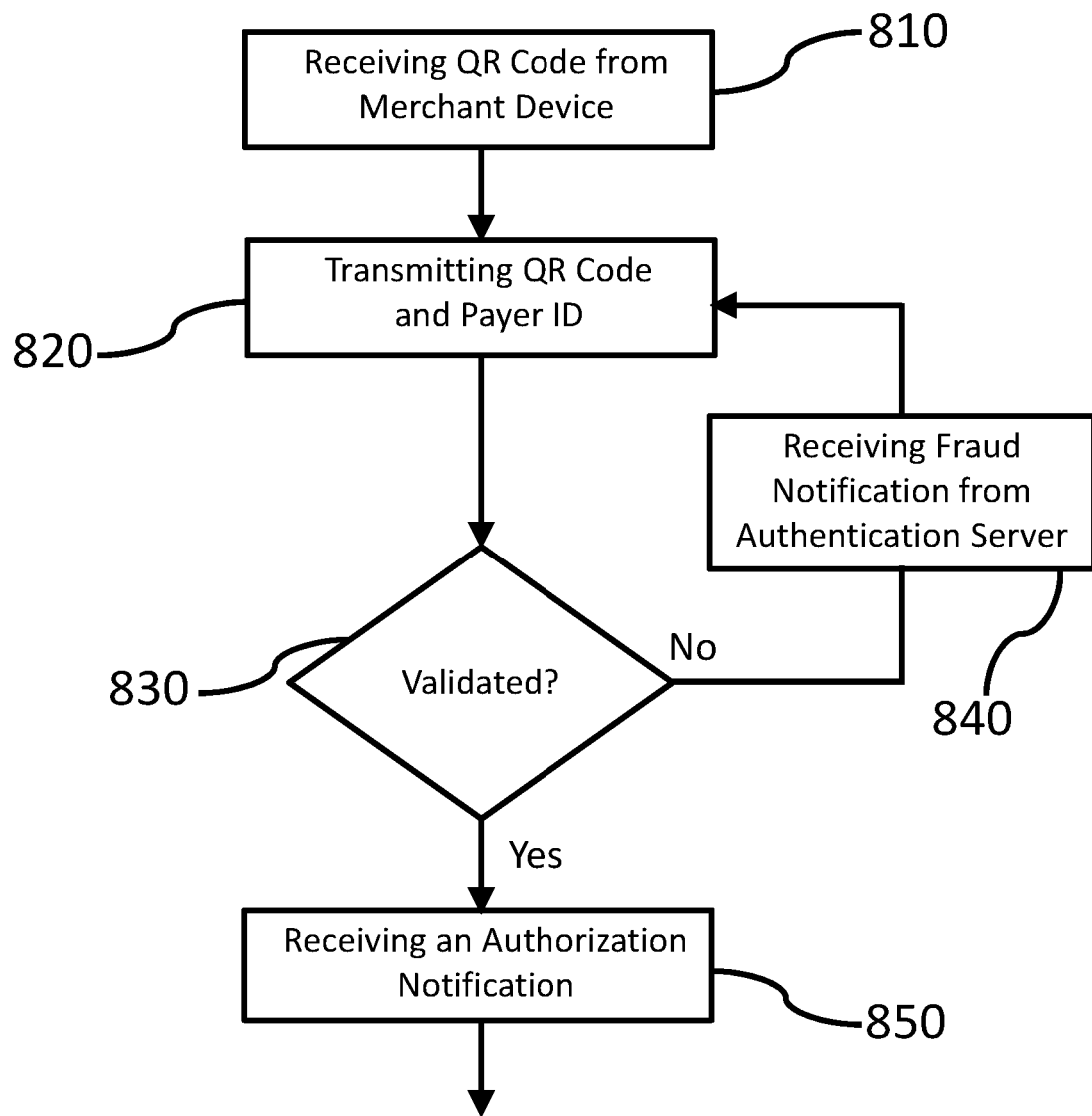
FIG. 8 illustrates an example flow of a method for transaction validation.

FIG. 8 illustrates an example flow of a method for transaction validation which may be suitable for providing a payer-controlled payment processing service. At 810, merchant identification, kiosk identification identifying the merchant kiosk, a security key and transaction information are received from a merchant kiosk such as merchant kiosk 600. A merchant IP address may also be received. Provided the payer approves the transaction, at 820, a payer device, for example payer device 700, transmits to the authorization server, the merchant identification, the kiosk identification, the security key and the transaction information as well as payer identification associated with the payer device in an authorization database of the authorization server. The payer device may further transmit the merchant IP address and a payer IP address.

In an example, the payer device receives the merchant identification, the kiosk identification, the security key, the transaction information and the payer identification packaged as a QR code.

The method includes transmitting the merchant identification, the kiosk identification, the security key, the transaction information and the payer identification without transmitting payer account numbers or card numbers. In a high security embodiment, neither account numbers, nor card numbers are transmitted during the transaction validation method by the payer device.

In an example, if a payer has registered more than one account for the payer-controlled payment process, he or she may be offered a list of accounts to choose from to complete the transaction. The list may be organized or prioritized according to an account hierarchy established by the user or, for example, by account balances or limits. In another example, an account may be automatically selected from the list according to the hierarchy.

At 830, the objects received by the payer device are validated, for example, by authorization server 300. Here again the payer may provide a passcode and/or a biometric authentication to confirm the desire to complete the transaction. The payer device receives a fraud notification at 840 when the merchant identification is not registered with the kiosk identification in the authorization database, the payer identification is not registered with a payer token in the authorization database, the security key is invalid or any combination of these. See, for example, FIG. 5 for validation details. In an example, the payer device is configured to validate a QR code received from the merchant kiosk for example by confirming it is of a base form valid for use in the disclosed payment authorization service.

The payer device receives an authorization notification from the authentication server at 850 based upon an authorization report received by the authorization server for a transaction referred to by the transaction information. The received authorization notification reflects approval of a transaction referred to by the transaction information when a limit associated with an account matched with the payer identification is equal to or greater than an amount reflected in the transaction information. Upon approval, the payer may be asked to confirm the transaction in addition to or instead of earlier confirmations which confirmation may, as above, include providing a passcode and/or a biometric authentication to confirm the desire to finalize the transaction.

The received authorization notification reflects denial of a transaction referred to by the transaction information when a limit associated with an account matched with the payer identification is less than an amount reflected in the transaction information. Upon a denial of a transaction, a payer my be offered an opportunity to try again to authorize the transaction with another account. In an example, the payer may select another account from a list of accounts. In another example, the payer device may be configured to automatically attempt the transaction again with another account from the list based upon an account hierarchy.

Embodiments of the disclosure provide a computer program product that includes a non-transitory or non-transient computer-readable storage medium storing computer-executable code for transaction validation. The code, when executed, is configured to perform the actions of the method as described in conjunction with FIG. 8. As actions of the disclosed methods may be provided in different sequences, so the computer-executable code may be configured to provide a service having a different sequence of actions from those illustrated in FIG. 8. In some examples, the code may be downloaded from a software application store, for example, from an "App store", to a data processing unit. In an example, the code is implemented as payer application 716.

The code, when executed, is configured to cause a payer device to receive, merchant identification, kiosk identification identifying the merchant kiosk, a merchant IP address, a security key, transaction information or any combination of these. The code is further configured to cause the payer device to transmit, to an authorization server: the merchant identification, the kiosk identification, the security key and the transaction information and payer identification associated with the payer device in an authorization database of the authorization server. Further, the payer device may transmit the merchant IP address and/or a payer IP address. The code is further configured to cause the payer device to receive an authorization notification based upon an authorization report received by the authorization for a transaction referred to by the transaction information.

Modifications to embodiments of the disclosure described in the foregoing are possible without departing from the scope of the disclosure as defined by the accompanying claims. The overall appeal of disclosed systems and methods may be improved for both payers and merchants.

Disclosed systems, methods and payer-controlled payment processing services facilitate a variety of value or credit exchange transactions including within the gift card, e-check, wire transfer, swift international fund transfer industries. Within credit card and/or debit card industries disclosed systems, methods and payer-controlled payment processing services support in-person transactions, e-commerce online purchases as well as mail order and telephone order transactions.

Loans may be requested, loan funding may be obtained or loan payments may be made. A business to business payment system may be provided for vendors and suppliers as well as many other business to business enhancements. Coupons and specials may be offered as targeted to the payer. Coupons and/or specials may be redeemed with an electronic record. Prizes and sweepstakes may be offered to stimulate payer visits to merchant locations. Disclosed systems and methods may be integrated with merchant point of sale systems.

Expressions such as "including", "comprising", "incorporating", "consisting of", "have", "is" used to describe and claim the disclosure are intended to be construed in a non-exclusive manner, namely allowing for items, components or elements not explicitly described also to be present. Reference to the singular is also to be construed to relate to the plural.

What is claimed is:

1. A distributed payer-controlled transaction apparatus comprising:
   an authorization server comprising: an authorization server processor; and an authorization server memory, wherein the authorization server memory is operably coupled with the authorization server processor;
   a communication network, operably coupled with the authorization server, wherein the communication network is operably coupled with an acquirer system;
   a merchant device comprising: a merchant device processor operably coupled with the communication network; and a merchant device memory, wherein the merchant device memory is operably coupled with the merchant device processor;
   a payer device comprising:
      a payer device processor operably coupled with the communication network;
      a payer authentication input interface operably coupled with the payer device processor, the payer authentication input interface configured to receive a payer authentication input comprising a biometric authentication;
      an image-capturing interface operably coupled with the payer device processor, the image-capturing interface configured to scan an image and read data from the scanned image;
      a near-field communication interface operably coupled with the payer device processor, the near-field communication interface configured to receive and translate data from one or more near-field communications beacons or tags; and
      a payer device memory, wherein the payer device memory is operably coupled with the payer device processor;

a virtual private network (VPN) communicatively coupled with the merchant device processor and the payer device processor, wherein the VPN tunnels through the communication network, wherein the payer device is configured to receive a first encrypted message from the merchant device using at least one of: the VPN, the image-capturing interface, and the near-field communication interface, depending on a type of the transaction initiated by the payer device; and in response to receiving a purchase request from the payer device: send on the VPN, to the payer device, the first encrypted message comprising a security key, merchant ID and transaction information referencing the purchase request.

2. The apparatus of claim 1, wherein, the authorization server memory comprises processor executable program instructions configured receive on the communication network a merchant registration request for the merchant device and in response to receiving the merchant registration request: send on the communication network a request for merchant account confirmation to the acquirer system.

3. The authorization server memory of claim 2, further comprising processor executable program instructions configured to receive on the communication network merchant account confirmation the acquirer system can access an account identified by merchant account information from the acquirer system and in response to receiving the merchant account confirmation from the acquirer system: register the merchant device and associate the merchant device with merchant account information; and send on the communication network, to the merchant device a security key generated by the authorization server processor.

4. The authorization server memory of claim 3, further comprising processor executable program instructions configured to receive on the communication network a payer registration request from the payer device; and in response to receiving the payer registration request:
  associate payer account information with a payer token issued by the authorization server from a plurality of payer tokens stored in an authorization database;
  send on the communication network, to the payer device, the payer token associated with payer account information and the security key; and
  register and store the payer account information and the payer token in an authorization database.

5. The authorization server memory of claim 4, further comprising processor executable program instructions configured to determine whether the payer token associated with the payer account information and the security key are invalid and then send at least one notification on the communication network and end the transaction.

6. The authorization server memory of claim 4, further comprising processor executable program instructions configured to determine whether the payer token associated with the payer account information and the security key are valid and then:
  receive on the communication network, from the acquirer system, a transaction approval code and authorization uniquely associated with the transaction request and the purchase request presented to the merchant by the payer; and in response to receiving the transaction approval code and authorization:
  send on the communication network, to the merchant device, the transaction approval code; and
  send on the communication network, to the payer device a notification the transaction was approved for the authorized registered payer account.

7. The authorization server memory of claim 4, wherein, the payer device memory comprises processor executable program instructions configured to send on the communication network a payer registration request comprising payer account information, receive and store on the communication network, from the authorization server, the security key and the payer token associated with the registered payer account information;
  receive from a payer using the payer device a biometric authentication input confirmation the payer is initiating a transaction with a merchant using the merchant device;
  in response to receiving the biometric authentication input confirmation the payer is initiating the transaction receive, from the merchant device, a first encrypted message; and
  present, to the payer identified with the payer account information and using the payer device, the registered payer account with a request for payer input comprising a biometric authentication confirming payer authorization to use the registered payer account to complete the purchase request referenced by the transaction information.

8. The apparatus of claim 1, wherein the operations performed by the authorization server in response to receiving the merchant account confirmation from the acquirer system further comprise: end registration for the merchant device, comprising configuring the authorization server to refuse all network communication with the merchant device.

9. The apparatus of claim 1, wherein the merchant device further comprises a graphical display operably coupled with the merchant device processor, the graphical display configured to display an image.

10. The apparatus of claim 1, wherein the merchant device further comprises one or more near-field communications beacons or tags operably coupled with the merchant device processor, the one or more near-field communications beacons or tags configured to present data.

11. The apparatus of claim 1, wherein the operations performed by the authorization server further comprise: in response to receiving the merchant account confirmation from the acquirer system, send, to the merchant device, a copy of the security key sent to the payer device.

12. The apparatus of claim 1, wherein the operations performed by the authorization server further comprise: send, to the payer device, a copy of the security key sent to the merchant device.

13. The apparatus of claim 1, wherein the operations performed by the merchant device further comprise: encode the security key, the merchant ID and transaction information comprising the purchase request in an image and display the image.

14. The apparatus of claim 1, wherein the operations performed by the payer device further comprise: receive the security key, the merchant ID and the transaction information from the merchant device based on capturing an image displayed by the merchant.

15. The apparatus of claim 8, wherein the image further comprises a bar code or a QR code.

16. The apparatus of claim 1, wherein the operations performed by the authorization server further comprise determine whether the payer ID is valid, comprising determine whether the payer ID is registered in the authorization database.

17. The apparatus of claim 1, wherein the operations performed by the authorization server further comprise determine whether the merchant ID is valid based on determining whether the merchant ID is associated in the authorization database with a valid security key comprising a base form, core, or kernel of a predetermined general code.

18. The apparatus of claim 1, wherein the security key further comprises a base form, core, or kernel of a predetermined general code underlying all codes and security keys exchanged between any combination of the merchant device, the payer device and the authorization server.

19. The apparatus of claim 12, wherein the operations performed by the authorization server determining whether the security key is valid further comprise determining whether the security key includes the base form, core, or kernel of the predetermined general code.

20. The apparatus of claim 1, wherein in response to receiving, from the payer device, the second encrypted message the operations performed by the authorization server further comprise determine whether the transaction information is valid, comprising determine whether the security key includes a base form, core, or kernel of a predetermined general code.

21. The apparatus of claim 14, wherein the operations performed by the authorization server further comprise: upon a determination the transaction information is not valid, sending at least one notification to the payer device, sending at least one notification to the merchant device, and ending the transaction.

22. The apparatus of claim 1, wherein the operations performed by the authorization server further comprise forwarding a result of the transaction approval to the payer device and the merchant device.

23. The apparatus of claim 1, wherein the biometric authentication further comprises a fingerprint.

24. The apparatus of claim 1, wherein the apparatus further comprises the payer authentication input interface further configured to receive a passcode authentication.

25. The apparatus of claim 1, wherein the image-capturing interface further comprises a camera.

26. The apparatus of claim 1, wherein the payer device memory further comprises processor executable program instructions configured to cause the payer device to use at least the VPN to receive the first encrypted message from the merchant if the type of the transaction is online; use at least the image-capturing interface to receive the first encrypted message from the merchant if the type of the transaction is physical point of sale; and use at least the near-field communication interface to receive the first encrypted message from the merchant if the type of the transaction is wireless.

* * * * *